(12) United States Patent
Van de Waerdt et al.

(10) Patent No.: US 11,416,421 B2
(45) Date of Patent: Aug. 16, 2022

(54) CONTEXT-BASED PROTECTION SYSTEM

(71) Applicant: Cypress Semiconductor Corporation, San Jose, CA (US)

(72) Inventors: Jan-Willem Van de Waerdt, San Jose, CA (US); Kai Dieffenbach, Egelsbach (DE); Uwe Moslehner, Dreieich (DE); Jens Wagner, Babenhausen (DE); Mathias Sedner, Egelsbach (DE); Venkat Natarajan, Sunnyvale, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/653,203

(22) Filed: Jul. 18, 2017

(65) Prior Publication Data

US 2018/0024945 A1    Jan. 25, 2018

Related U.S. Application Data

(60) Provisional application No. 62/364,652, filed on Jul. 20, 2016, provisional application No. 62/364,246, filed on Jul. 19, 2016.

(51) Int. Cl.
| | |
|---|---|
| *G06F 3/00* | (2006.01) |
| *G06F 5/00* | (2006.01) |
| *G06F 12/14* | (2006.01) |
| *G06F 13/42* | (2006.01) |

(Continued)

(52) U.S. Cl.
CPC ........ *G06F 12/1491* (2013.01); *G06F 12/145* (2013.01); *G06F 12/1441* (2013.01); *G06F 12/1458* (2013.01); *G06F 13/4282* (2013.01); *G06F 21/572* (2013.01); *G06F 21/76* (2013.01); *G06F 2212/1052* (2013.01)

(58) Field of Classification Search
CPC ............... G06F 12/1441; G06F 12/145; G06F 12/1458; G06F 13/4282; G06F 21/572; G06F 21/76
USPC .......................................................... 710/36
See application file for complete search history.

(56) References Cited

U.S. PATENT DOCUMENTS

| | | | |
|---|---|---|---|
| 6,401,155 B1 * | 6/2002 | Saville | G06F 9/462 |
| | | | 710/266 |
| 8,949,551 B2 | 2/2015 | Moyer | |
| 9,003,148 B2 | 4/2015 | Ono et al. | |

(Continued)

FOREIGN PATENT DOCUMENTS

| | | |
|---|---|---|
| EP | 2172844 A1 | 4/2010 |
| JP | 2006216012 A | 8/2006 |

(Continued)

OTHER PUBLICATIONS

Hattendorf, Anton, "Shared Memory Protection for Spatial Separation in Multicore Architectures," ResearchGate.net, Jun. 2012; 1 page.

(Continued)

*Primary Examiner* — Chun Kuan Lee

(57) ABSTRACT

A context-based protection system uses tiered protection structures including master protection units, shared memory protection units, a peripheral protection units to provide security to bus transfer operations between central processing units (CPUs), memory array or portions of arrays, and peripherals.

18 Claims, 5 Drawing Sheets

(51) Int. Cl.
*G06F 21/57* (2013.01)
*G06F 21/76* (2013.01)

(56) References Cited

U.S. PATENT DOCUMENTS

| | | | |
|---|---|---|---|
| 9,213,866 B1 | 12/2015 | Ahmad et al. | |
| 9,361,121 B2 | 6/2016 | James et al. | |
| 9,389,793 B2 | 7/2016 | Soja et al. | |
| 9,430,409 B2 | 8/2016 | Berntsen et al. | |
| 2004/0003277 A1 | 1/2004 | Rabeler | |
| 2004/0243823 A1 | 12/2004 | Moyer et al. | |
| 2005/0235084 A1 | 10/2005 | Nariai | |
| 2008/0005513 A1 | 1/2008 | Lim | |
| 2008/0109903 A1 | 5/2008 | Werner et al. | |
| 2009/0113141 A1* | 4/2009 | Bullman | G06F 11/004 711/147 |
| 2012/0215991 A1 | 8/2012 | Moyer | |
| 2013/0111168 A1 | 5/2013 | Circello et al. | |
| 2014/0351472 A1* | 11/2014 | Jebson | G06F 13/24 710/269 |
| 2015/0254017 A1 | 9/2015 | Soja et al. | |
| 2015/0356016 A1 | 12/2015 | Robertson et al. | |
| 2016/0156632 A1 | 6/2016 | Rohleder et al. | |
| 2017/0220489 A1* | 8/2017 | Ahmed | G06F 12/1408 |

FOREIGN PATENT DOCUMENTS

| | | |
|---|---|---|
| JP | 2013097794 A | 5/2013 |
| JP | 2013539106 A | 10/2013 |
| JP | 2015035155 A | 2/2015 |
| WO | 2016153683 A1 | 9/2016 |

OTHER PUBLICATIONS

Koeberl, Patrick, "TrustLite: A Security Architecture for Tiny Embedded Devices," ResearchGate.net, Apr. 2014; 15 pages.

Masti, Ramya, "Enabling Trusted Scheduling In Embedded Systems," Institute of Information Security, Dec. 3, 2012, pp. 61-70; 10 pages.

JPO Office Action for Application No. 2019-500641 dated Feb. 2, 2021; 4 pages.

* cited by examiner

CONTEXT-BASED PROTECTION SYSTEM

RELATED APPLICATIONS

This patent application claims the benefit of U.S. Provisional Patent Application No. 62/364,652 filed Jul. 20, 2016, and U.S. Provisional Patent Application No. 62/364,246, filed Jul. 19, 2016, all of which are incorporated by reference herein in their entirety.

TECHNICAL HELD

The present disclosure relates generally to embedded systems, and more particularly security of communication and data within embedded systems.

SUMMARY

Figure 1:
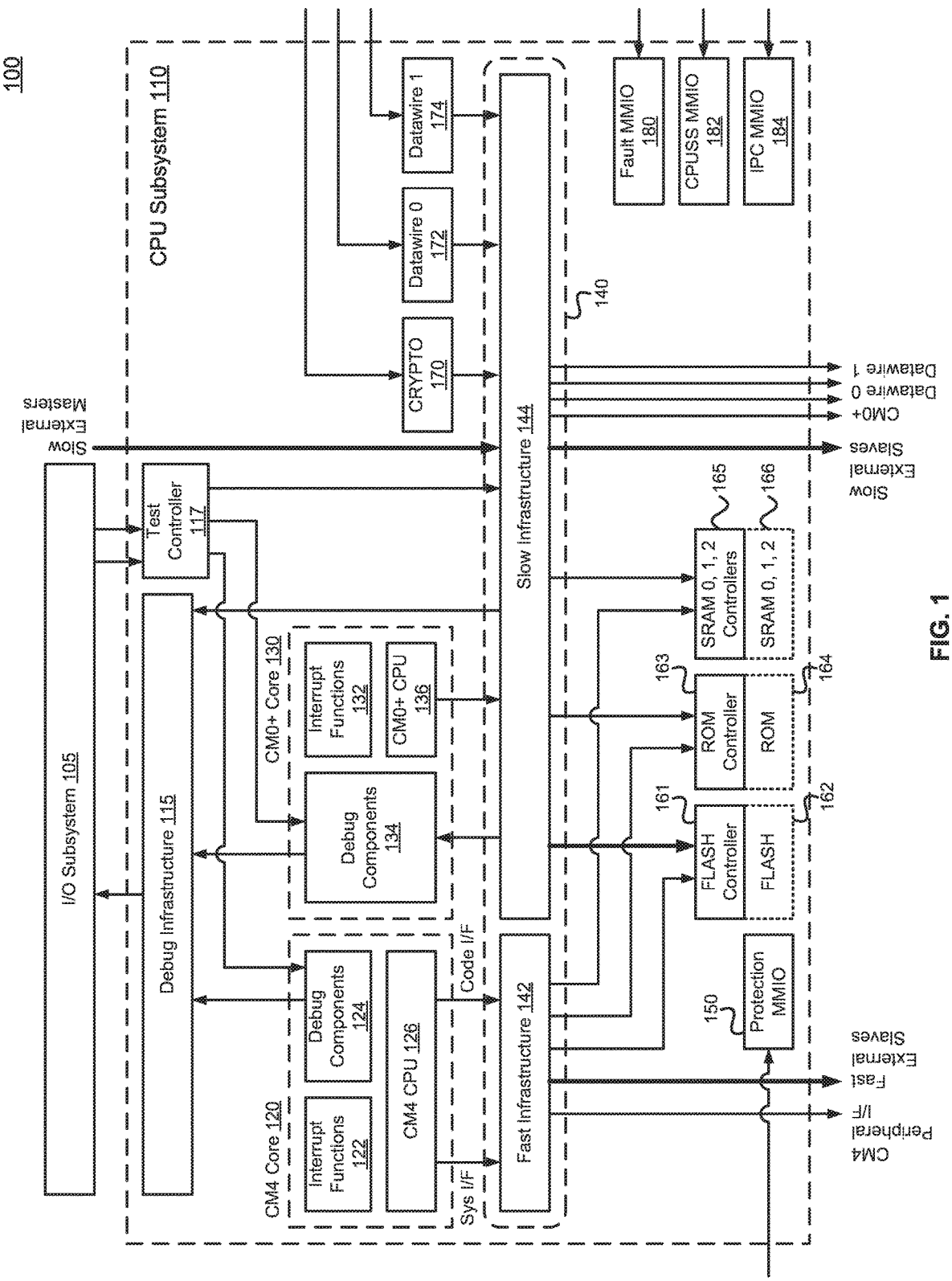
FIG. 1 illustrates an embedded system configurable to implement a context-based protection system, according to one embodiment.

Embedded systems function by passing information to and from various components over a series of buses. A processing unit of an embedded system may be configured to execute instructions or access information stored in a memory or memories. The processing unit may also communicate with or control other system components such as digital and analog blocks or peripheral devices. The digital or analog blocks or even the peripheral devices may be hard-coded (fixed-function) or they may be programmable. Control of system components and access to or transfer of information may be accomplished over the series buses or bus infrastructures.

A context-based protection system may include a central processing unit (CPU) configurable to operate in a plurality of protection contexts. The context-based protection system may also include at least one peripheral module, the peripheral module accessible by the CPU when the CPU is configured in a first protection context of the plurality of protection contexts and inaccessible by the CPU when the CPU is configured in a second protection context of the plurality of protection contexts The context-based protection system may be implemented as part of a bus infrastructure comprising protection structures. The protection structures may include a memory protection unit assigned to a single bus master, the MPU to differentiate user and privileged accesses from the bus master. The protection structures may include a shared memory protection unit (SMPU) assigned to a plurality of bus masters, the SMPU to differentiate between different protection contexts and to differentiate between secure and non-secure access to a memory. The protection structures may also include a peripheral protection unit (PPU) assigned with a peripheral group, the PPU to differentiate secure and non-secure accesses to the peripheral group.

DETAILED DESCRIPTION

A bus transfer of information may occur simultaneous to other bus transfers. Different processing units may access different system components based on the system requirements and the various tasks that may be completed by the system. As there is so much happening on the buses simultaneously, it is important to track and control transfer operations and attempted transfer operations to ensure the system operates as intended with optimal performance and require security.

Embedded systems may also require protection to realize security, functional safety, and performance. With regard to security, it is necessary to protect secure memory and MMIO address regions from unauthorized accesses. That is, accesses to programs and data storage must be restricted to authorized uses, but so must peripheral devices that may receive commands or share data over a bus. With regard to functional safety, tasks and processes must be prohibited from accessing memory and MMIO address regions that are associated with other tasks and processes. Isolation ensures that operation of each may occur even in the presence of bus interference. On the other hand, memory and MMIO address regions must be protected from tasks and processes that are not associated with them so that they are available to their designated tasks and processes. All of this protection may lead to bus latency, impacting performance. And reconfiguration of any protection system must also be possible without creating latency problems.

FIG. 1 illustrates a system 100 which may be configured to provide security through a configurable bus architecture 140. System 100 may include an I/O subsystem 105 coupled to a CPU subsystem 110. CPU subsystem 100 may be configured to have a number of inputs and outputs including those from and to I/O subsystem 105 as well as from peripheral groups (elements not shown, but connections to peripheral groups 1 and 2 are shown). Other connections to CPU subsystem 110 may also be present, as described below.

CPU subsystem 110 may include a debug infrastructure 115 and a test controller 117 each coupled to I/O subsystem 105 and to a first processing core and a second processing core. The first processing core may be implemented as an ARM Cortex M4, CM4 core 120. CM4 core 120 may include a CM4 central processing unit (CPU) 126, interrupt functions 122 and debug components 124. CM4 core 120 may be configured to run at a faster processing speed and to address higher processing and performance requirements. The second processing core may be implemented as an ARM Cortex M0+, CM0+ core 130. CM0+ core 130 may include a CM0+ CPU 136, interrupt functions 132, and debug components 134. CM0+ core 130 may be configured to fun at a slower processing speeds (frequencies) and may act as an auxiliary processor.

CPU subsystem 110 may also include configurable bus architecture 140, which may include a fast infrastructure 142 and slow infrastructure 144. Configurable bus architecture 140 may be configured to provide security to data and commands that pass from processing cores, memories, and peripheral units. Configurable bus architecture 140 may be coupled flash controller 161 for flash 162, to ROM controller 163 for ROM 164, and to SRAM controllers 165 for SRAM 166. In one embodiment, there may be multiple SRAM modules and an associated SRAM controller for each.

Memory locations may be part of CPU subsystem 110 or part of separate system components in various embodiments.

Fast infrastructure 142 may be coupled to a CM4 core 120 through a system interface (Sys I/F) and a code interface (Code I/F) to receive information and commands from CM4 core 120. Fast infrastructure 142 may also be coupled to a peripheral interface and to slaves running at faster processing speeds (fast external slaves).

Slow infrastructure 144 may be coupled to test controller 117 and to slow external masters as well as CRYPTO block 170 and a pair of datawires: datawire 0 172 and datawire 1 174. Slow infrastructure 144 may also be coupled to slow external slave devices, CM0+ core 130 and to the pair of datawires 172 and 175. Slow infrastructure 144 may also be coupled to peripheral units external to the CPU subsystem 110. Extremal peripheral units may include slow external slaves.

Configurable bus architecture 140, including fast infrastructure 142 and slow infrastructure 144 may provide protection or security by implementing protection logic that allows or restricts transfers over the buses based on bus transfer specifics. Bus transfer specifics may include bus address ranges and different attributes, including a read/write, execute, privileged/user, secure/non-secure, and others. Protection for memory may be provided by memory protection units (MPUs) and shared memory protection units (SMPUs). Protection for peripherals may be provided peripheral protection units (PPUs). SMPUs and PPUs may support context-based protection tracking based on protection context attributes of a bus master. With this configuration, a single bus master may operate in multiple protection roles by reprogramming a field associated with the protection context.

CPU subsystem 110 may include protection MMIO registers 150, fault detection MMIO registers 180, CPU subsystem (CPUSS) MMIO registers, and interprocessor communication (IPC) MMIO registers 184 to control and configure various elements of the CPU subsystem and provide functionality of a protection system.

Figure 2:
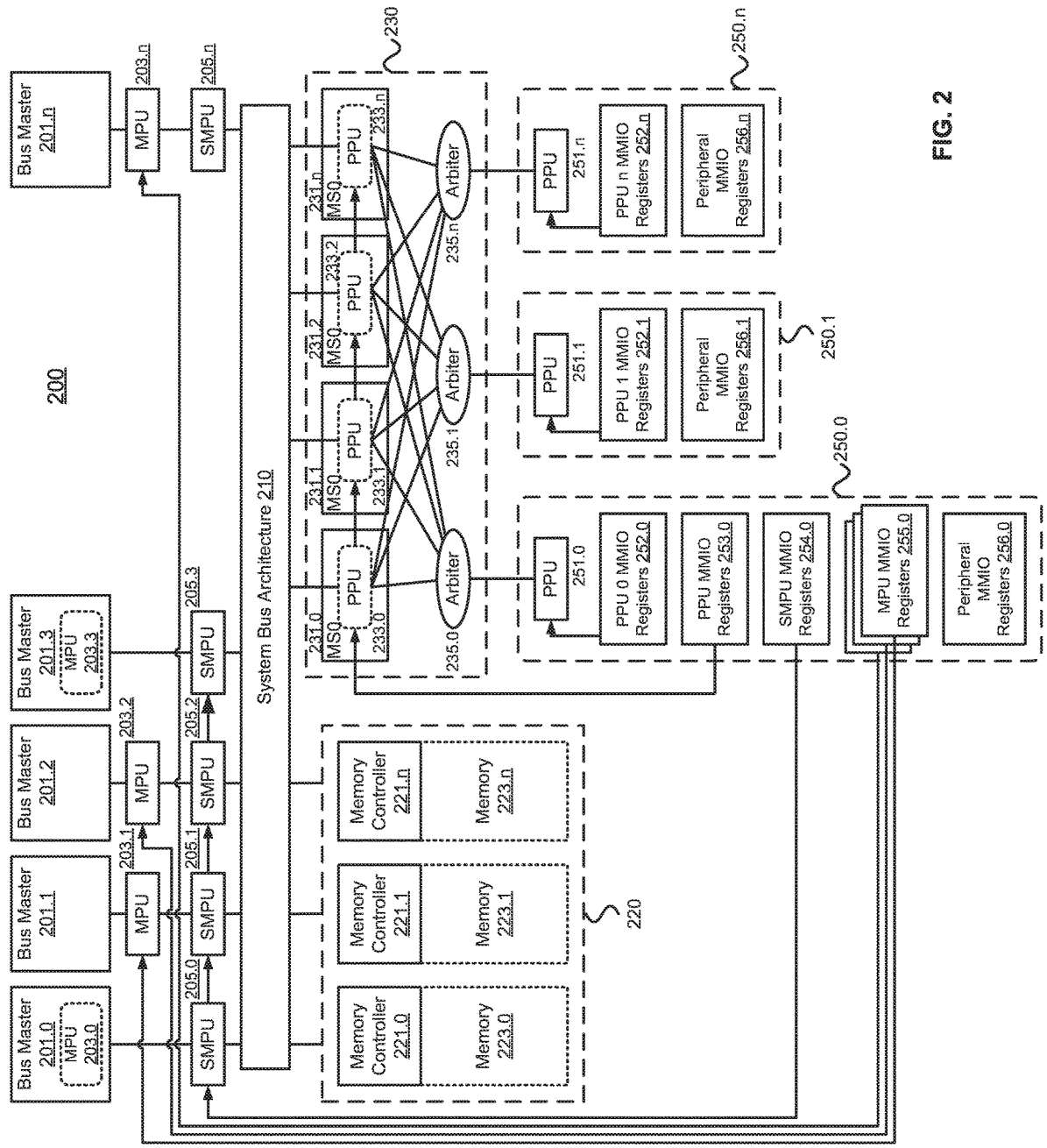
FIG. 2 illustrates a context-based protection system, according to one embodiment.

FIG. 2 illustrates a block diagram of a protection system 200 that may implement protection contexts according to one embodiment of the present invention. Protection system 200 may be implemented, in part, in configurable bus infrastructure 140 of FIG. 1, in one embodiment. Various elements of protection system 200 may be implemented as register locations accessible by system bus architecture 210 and CPU subsystem 110 of FIG. 1.

Protection system 200 may include a number of bus masters 201.0-201.$n$. Bus masters 201.0-201.$n$ may control traffic on system bus architecture 210 as information is read from and written to memory locations of memory array 220 and to peripherals which may be parts of peripheral groups 250.0-250.$n$. Bus masters 201.0-201.$n$ may each have a memory protection unit (MPU) 203.0-203.$n$. MPUs 203.0-203.$n$ may be integrated into the bus master, as shown in bus masters 201.0 and 201.3 or they may be separate elements, implemented as stand-alone units (bus maters 201.1 and 201.2) or as part of the system bus architecture, not shown.

When an MPU is implemented as part of a bus master, as is the case for bus masters 201.1 and 201.2 the MPU may be implemented as part of the CPU and may be under the control of the operating system (OS) or kernel. When an MPU is implemented separate from a bus master, as is the case for MPUs 203.1 and 203.2, the MPU may be implemented as part of the bus architecture (such as system bus infrastructure 210). In such an embodiment, the MPU may be under the control of the OS or kernel of the CPU that "owns" or uses the bus master. For example, MPU 203.1 may be under control of the OS or kernel of a CPU that owns bus master 201.1. MPUs that are implemented as part of the system infrastructure 210 may be associated with bus masters such as USB controllers, ethernet controllers for graphic controllers. This list is not intended to be exhaustive; other bus masters may be used with the system bus infrastructure 210. In one embodiment. MPUs like those illustrated as MPU 203.1 and 203.2 may be implemented as part of a CPU to ensure a consistent software interface. In such an embodiment, the MPU may be associated with a specific memory region and may be assigned a specific access attribute definition. Specific access attribute definitions may define how and why access is provided to various system components and memory locations as described below.

MPUs 203.0-203.$n$ may distinguish between user and privileged access for a single bus master (201.1-201.$n$, respectively). MPUs may also perform access control of the secure/non-secure attribute. If a bus master, such as bus masters 201.0-201.$n$, changes tasks or if a non-CPU master that is associated with a stand-alone MPU changes ownership, MPU settings may be updated by the OS or kernel software.

In one embodiment, direct memory access (DMA) controllers may be implemented with an MPU. In this embodiment, the DMA controller may inherit access control attributes of a bus transfer (or bus transfers) that programmed the channel to which the DMA controller is connected.

Protection system 200 may also include a number of shared memory protection units (SMPUs) 205.0-205.$n$. SMPUs 205.1-205.$n$ may each be associated with a bus master (201.1-201.$n$ respectively) and be disposed between an MPU, if implemented, and system bus architecture 210. SMPUs may be shared by all bus masters 201.1-201.$n$; this is in contrast to MPUs 203.1-203.$n$, which may be dedicated to a single bus master. SMPUs 205.1-205.$n$ may distinguish between different protection contexts and between secure and non-secure accesses. SMPUs 205.1-205.$n$ may also perform access control based on the user/privileged mode attribute.

Protection system 200 may include a system bus architecture 210 which is coupled to bus masters 201.1-201.$n$ and to a memory subsystem 220. Memory subsystem 220 may include at least one memory array (illustrated as three memory arrays, 223.0-223.2) and at least one memory controller (illustrated as three memory controllers, 221.0-221.2). Memory controllers 221.0-221.2 may control read and write operations memory locations of memory arrays 223.0-223.2 based on bus transfers and commands on system bus architecture 210 as instructed by bus masters 201.1-201.$n$. Access to memory locations of memory arrays 223.0-223.2 may be controlled by MPUs 203.1-203.$n$ and SMPUs 205.1-205.$n$.

Protection system 200 may also include a peripheral bus architecture 230 coupled to system bus architecture 210. Peripheral bus architecture 230 may include at least one master/slave (MS) interface 231.1-231.$n$ coupled to the system bus architecture 210 for receipt of bus transfers from bus masters 201.1-201.$n$. MS interfaces 231.1-231.$n$ may include peripheral protection units (PPUs) 233.1-233.$n$.

Peripheral bus infrastructure 230 may include arbiters 235.0-235.$n$ for handling traffic between MS interfaces 231.1-231.$n$ and peripheral groups 250.0-250.$n$. For ease of description, only peripheral unit 250.0 is described below, but peripheral groups 250.1-250.$n$ may be constructed in the same way. Peripheral group 250.0 may include a PPU 251.0, PPU MMIO registers 252.0 and 253.0, SMPU MMIO registers 254.0, MPU MMIO registers 255.0, and peripheral MMIO registers 256.0. The various MMIO registers may be used to implement security and protection realized through system bus architecture 210 and bus architecture 140 of FIG. 1.

Protection system 200 may allow each bus master to access the peripheral subsystem through exactly one master/slave interface (MS0-MS3). The four master/slave interfaces ma enable up to four concurrent accesses to the peripherals as long as accesses are through different mater interfaces and are directed to different peripheral groups of the peripheral subsystem.

Each master/slave interface may include fixed PPU structures corresponding to each peripheral group as well as programmable PPU structures. In each of the peripheral groups, there may exist fixed PPU structures for peripheral subregions (e.g. 252 and 253) as well as fixed PPU structures for each peripheral (e.g. 251). Fixed PPU structures for the peripheral groups may deny or limit access to an entire peripheral group for certain protection contexts. In such an embodiment, exceptions for certain sub address ranges within the peripheral group may not be permitted. Fixed PPU structures for the peripheral groups may be given the highest priority, and they may be located in the master/slave interface (as part of PPU 233). With this embodiment, when an access is denied, the access will not reach the targeted peripheral group; the peripheral group may be accessed by another master interface simultaneously.

Fixed PPU structures for peripheral subregions as well as for whole peripherals may include address ranges that are smaller than a peripheral group. Consequently, they may be located within the peripheral group itself. As fixed PPU structures for the peripheral subregions create exceptions from the protection attributes of the whole peripheral, so they may have a higher priority than the fixed PPU structures that are defined for the entire peripheral.

Programmable PPU structures may cover the combined address range of all of the peripheral groups. Programmable PPU structures may therefore be located in the master/slave interfaces. In other embodiments, programmable PPU structures may be located within the peripheral groups. In a first embodiment, there may be duplicate programmable PPU structures in each peripheral groups. In a second embodiment, the programmable PPU structures may be distributed among the peripheral groups.

Figure 3:
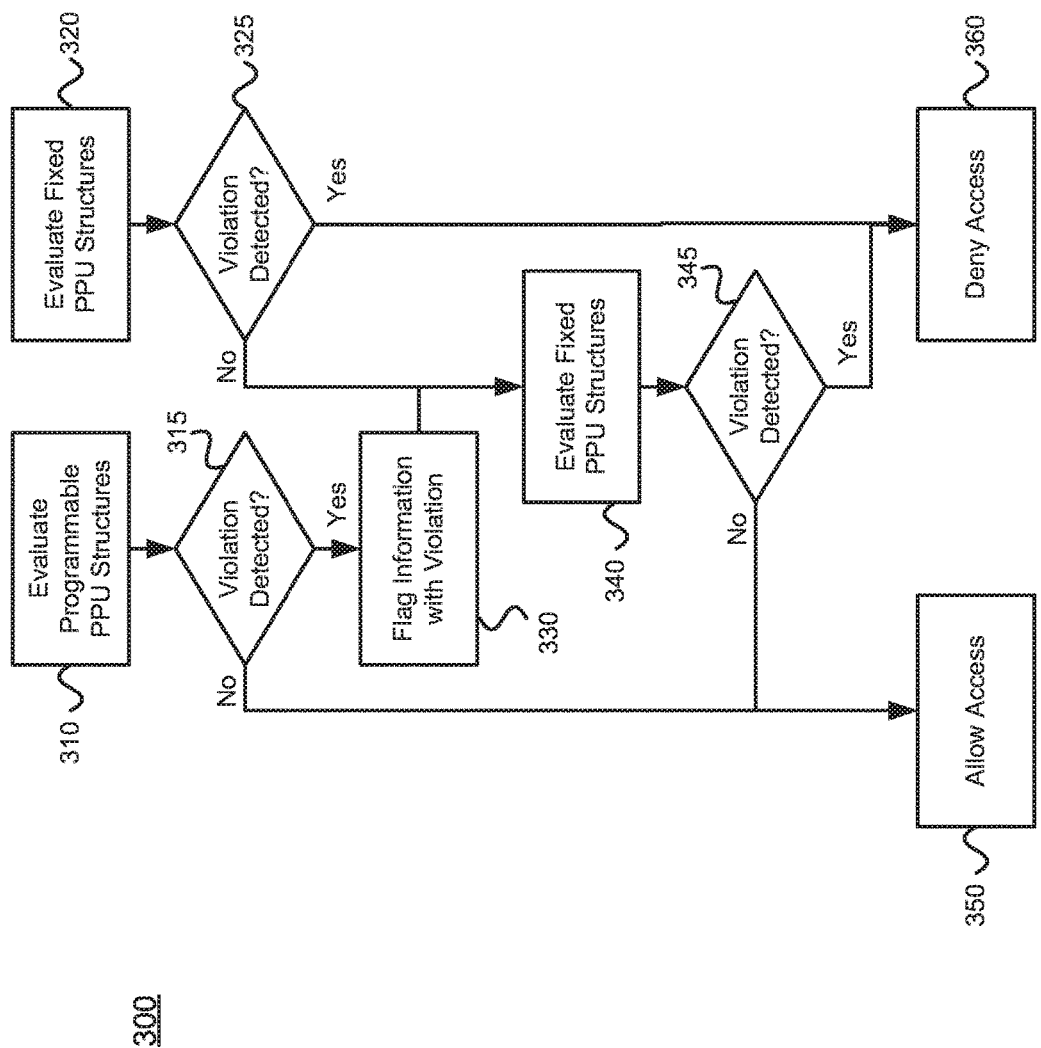
FIG. 3 illustrates a method to evaluate security of transfers to/from a peripheral using a protection system, according to one embodiment.

FIG. 3 illustrates a method 300 to ensure that programmable PPU structures are evaluated after fixed PPU structures in the peripheral groups. Programmable PPU structures are evaluated in step 310. If a violation is detected in decision step 315, information may be flagged with the violation. Fixed PPU structures may be evaluated in step 320. In one embodiment, step 320 may occur simultaneous to or separate from step 310. If a violation is not detected in decision step 325, the flagged information from step 330 may be evaluated in step 340. If there is no violation detected in decision step 345, access may be granted in step 350. If there was no violation detected in decision step 315, access may also be granted in step 350. IF a violation is detected in either decision step 325 or decision step 345, access may be denied in step 360.

Protection system 200 of FIG. 2 may provide a context-based protection scheme with the MPUs, SMPUs, and PPUs that allows multiple protection structures to be supported, with each structure specifying an address range in a unified memory architecture and access attributes that govern how access to a given address range is permitted. A violation that is detected or prohibited by the protection system may be caused by a mismatch between a bus transfer's address region and access attributes and the protection structures' address ranges and access attributes. When a violation is detected the violation may be captured in a fault report structure, such as fault MMIO 180 of FIG. 1, which may allow for future analysis. It may be useful to understand the cause of errors. A fault in the operation may be due to bugs in the programming or system definition. Faults may be due to unauthorized attempts at access or control. Fault report structures may generate an interrupt to indicate the occurrence of a fault. In one embodiment, the interrupt may be used to indicate to a processing device outside the system that a fault has occurred and that analysis is necessary. This may be particularly useful when a bus master cannot resolve the bus error itself, but requires another bus master to resolve the bus error on its behalf.

A violation of the protection system resulting in a bus error prohibits the bus transfer from reaching its target. For example, an MPU or SMPU violation that targets a peripheral unit will not reach the peripheral's PPU.

Protection Contexts

Each Bus Master may have an MPU protection context field, PC[ ]. The protection context may be used as the protection context attribute for all bus transfers initiated by the Bus Master. SMPUs and PPUs may allow or prohibit (restrict) bus transfers to memory and peripheral locations that are initiated by the Bus Master based on the protection context assigned to said bus transfers.

In one embodiment, multiple Bus Masters may share a protection context. For example, a CPU and a USB controller that is under control of that CPU may share the same protection context. In this example, the CPU and the USB controller may have the same SMPU and PPU access restrictions and bus transfers from each (the CPU and the USB controller) may be allowed or prohibited under the same conditions and to the same memory or peripheral locations.

A Bus Master's protection context may be changed by reprogramming the PC[ ] field (PC[ ]). However, as the protection context functions to allow or prohibit bus transfers, changes to the PC[ ] field must be controlled. That is, changes to the PC[ ] field must maintain the security of the system. Failure to maintain the same level of security for updates to the PC[ ] field may allow changes to the security of the system that were not intended or that may circumvent the protection context. Furthermore, changes to protection context should incur only minimal CPU overhead so that protection contexts may be changed frequently without negatively impacting bus latency and performance. To accomplish frequency and secure changes to protection contexts, each Bus Master may have an SMPU protection context ask field that identifies the available protection contexts that may be programmed to the Bus Master PC[ ] field. The following fields may provide the requisite security for Bus Master protection context control:

MPU Protection Context Under the control of the Bus Master; has the same access restrictions as the Bus Master's MPU MMIO registers.

Protection Context Mask—Under the control of the Secure CPU; has the same access restrictions as the SMPU MMIO registers.

SMPUs and PPUs allow and restrict bus transfers based on the protection context attribute that is assigned to the bus transfers. The Protection Context therefore provides a step of protection between the Bus Master and the SMPU and the PPU protection. This embodiment allows a single Bus Master to identify with multiple protection roles by reprogramming the PC[ ] field. A change to the protection contexts has limited CPU overhead as the SMPUs and PPUs do not need to be reprogrammed.

Dedicated Functionality

It may be desirable to have one protection context with dedicated functionality. In one embodiment, the dedicated functionality may be assigned to protection context 0. Protection Context 0 may have complete access to all system components. It is important to establish "root of trust." Bus Master 0 may be used or permitted to function as a "secure CPU," such that the secure CPU may execute both manufacturer code and customer code. Manufacturer code for the CPU may be stored in read-only memory (ROM) or flash, such as ROM 164 and flash 162. Manufacturer ROM may be considered trustworthy (a root of trust) and used to authenticate manufacturer flash. In various embodiments, the manufacturer code may be used to provide flash programming, eFUSE programming or other manufacturer-proprietary functionality.

Customer code for execution by the secure CPU may be programmed in flash. The manufacturer may not have control of over this code. Customer code may therefore not be assumed to be trustworthy. Customer code execution should not compromise the trusted quality of the manufacturer code.

Because trusted manufacturer code and entrusted customer code may be executed by the same CPU, it may be necessary to provide a protection scheme that is based upon more than master-specific protection contexts. Special meaning given to Protection Context 0 may provide hardware support and control of secure CPU protection context. Protection Context 0 may provide unlimited (unprotected) access to all memory and peripheral locations. Protection Context 0 may be changed (or entered) under two conditions; the use of Protection Context 0 may therefore be restricted.

In the first condition, the secure CPU may be reset by the execution of a reset exception handler. In this condition, a vector address may be provided from a specific ROM address. Since ROM addresses are provided by the manufacturer, the vector address may be trusted and since the vector address is provided from ROM. The handler's entry point can therefore be trusted. After a secure CPU reset, all interrupts may be disabled and CPU execution may be deterministic (i.e., fully determined by the reset exception handler).

In the second condition, a secure CPU exception handler may be received. In this condition, the handler vector address may be provided by a vector table with a configurable base address. When the secure CPU is reset, the base address may be set to a default value and the handler vector address may be written. As the handler vector address is a ROM address, it can be trusted. However, the CPU may be relocated from the vector table base address to an SRAM address, and the handler vector address may be programmed to any value. The programmed value may result in customer provided handler code. In this case, the handler's entry point may not be trusted. However, the protection context may be changed to 0 only if the secure CPU vector handler address is the same as the specific vector address. It is possible for customer code to relocate the vector table, but a change to Protection Context 0 would require that the vector address is not modified. When the system detects that the secure CPU vector address is not the same as the handler, the protection context is not changed to 0. If it is already 0, it may be changed back to the value it was before it was changed to 0.

Security for Protection Context 0 is vital because Protection Context 0 identifies trusted manufacturer code and provides unlimited access (by SMPUs and PPUs).

Protection Structures

The protection system of the present invention is intended to allow or restrict bus transfers on a bus infrastructure (also called a system bus architecture herein). A bus transfer of the protection system specifies a number of attributes including:

an address range that is accessed by the bus transfer;
a read/write attribute;
an execute attribute;
a user/privileged attribute;
a secure/non-secure attribute; and
a protection context attribute.

A bus transfer address range specifies either memory locations or peripheral MMIO registers to which the bus transfer is intended. Structurally, there is little difference between memory protection and peripheral protection. However, implementation of security measures in a system is benefited from the separation of memory protection and peripheral protection. In some embodiments, this separation is achieved by providing memory protection in a CPU subsystem and providing peripheral protection in a peripheral subsystem.

The read/write attribute may provide protection to a memory or peripherals ability to be read from or written to by a specific master. The execute attribute may be used to set access to code or to data of a specific memory or peripheral. That is, a bus transfer may seek to access the code of a specific command or peripheral in one embodiment. While in another, a bus transfer may seek to access the output of the code or command once executed. The user/privileged attribute may be used to distinguish between OS or kernel access and task or thread access. The secure/non-secure attribute may be used to distinguish between secure and non-secure access. Finally, the protection context attribute may be used to silo certain peripherals, peripheral groups, or masters.

As described with regard to FIG. 1, there may be multiple levels of protection structures including memory protection units (MPUs), shared memory protection units (SMPUs), and peripheral protection units (PPUs). An MPU may be associated with a single master and may distinguish user and privileged access from the single associated mater. An MPU may also perform access control on the secure/non-secure attribute. Some masters may have a built-in MPU, such as bus masters 101.0 and 101.3 of FIG. 1. For other bus masters, the MPU may be implemented as part of the bus infrastructures, such as MPUs 103.1, 103.2, and 103.*n* of FIG. 1.

An SMPU may be shared by all the bus masters. In one embodiment, an SMPU may be shared by a subset of bus masters, but not all of the bus masters of the system. An SMPU may distinguish between different protection contexts and between secure and non-secure accesses. An SMPU may also perform access control on the user/privileged mode attribute. As SMPUs are shared, they are not implemented as part of specific or single bus masters. Instead, SMPUs may be implemented as part of the system bus architecture so that they can be accessed by as many bus masters as require them.

PPUs may be implemented as part of a master/slave interface as well as part of a peripheral group. Each bus master may access a peripheral subsystem through one master/slave interface including a PPU, such as MS interfaces 233 of FIG. 2. The peripheral group may be accessed by multiple masters through multiple master interfaces through a PPU that is dedicated to the peripheral group, such as peripheral groups 251 of FIG. 2. A peripheral up may consist of multiple peripheral units with a shared AHB-Lite bus infrastructure. PPUs may distinguish between different protection contexts, between secure and non-secure accesses, and between user mode and privileged mode accesses.

Each of the protection structures of the protection system may be defined by an address region and at least one access control attribute. The protection structure may be aligned with a given location of a memory space. Two registers, assigned to the protection structure address and attribute, respectively, may allow for protection of the protection structures.

The following resources may require protection that is achieved with the protection scheme described: peripherals within a peripheral group; and MMIO registers within a peripheral, such as individual IPC structures, data ire or direct memory access (DMA) controller channel structures, SMPU protection region structures, and PPU protection region structures. The above resources may cover fixed address ranges, or address ranges that are known at design time.

A protection unit, such as an MPU, and SMPU, or a PPU, may comprise multiple protection structures and may evaluate those multiple protections structures in decreasing order. Higher-indexed structures may take precedence over lower-indexed structures. For adequate security, it should not be possible for a non-secure protection context to add protection structures that have a higher index than the protection structures that provide secure access. In such a case, it may be possible for a protection structure with a higher index to be programmed to allow non-secure access. In a secure system, higher programmable protection structures are protected to allow only restricted accesses.

Compared to MPUS and SMPUs, PPUs may have a relatively large number of protection regions. Resources that may require protection provided by a PPU may include all the peripherals within a peripheral group or a set of MMIO registers within a peripheral. MMIO registers within a peripheral may include individual IPC structures, DMA controller channel structures, SMPU protection region structures, and PPU protection region structures.

PPU protection structures may include resources with a known address range, for which design-time configuration of the protection requires address range can be implemented. For resources that have an unknown address range, such as those that are identified by device usage, full programmability of the protection region's address range may be used.

Access Control Attributes

As stated above, access attributes may specify access control to a region. A region, or address region, may be defined by a base address, a size of the region, and subregions within the region that may be enabled or disabled. In one embodiment, there may be eight subregions. However, more or fewer subregions may be implemented.

Access control to a region may be applied to all of the subregions within the region. Access control is performed by evaluating transfer's access attributes. In various embodiments the following access control fields may be implemented:

Control for read accesses in user mode;
Control for write accesses in user mode;
Control for execute accesses in user mode;
Control for read accesses in privileged mode;
Control for write accesses in privileged mode;
Control for execute accesses in privileged mode;
Control for secure access;
Control for individual protection contexts, nay only be present in SMPUs and PPUs; and
Control of "matching" and "access evaluation processes", which may only be present in SMPUs and PPUs.

As an example, using the above access control fields, Protection Context 2 may be defined for non-secure access for read and write actions in privileged mode with the following settings:

| Mode | Setting | Outcome |
| --- | --- | --- |
| Read Access in User Mode | 0 | Read accesses in user mode not permitted |
| Write Access in User Mode | 0 | Write accesses in user mode not permitted |
| Execute Access in User Mode | 0 | Execute accesses in user mode not permitted |
| Read Access in Privileged Mode | 1 | Read accesses in privileged mode permitted |
| Write Access in Privileged Mode | 1 | Write accesses in privileged mode permitted |
| Execute Access in Privileged Mode | 0 | Execute accesses in privileged mode not permitted |
| Secure Access | 0 | Secure accesses not permitted |
| Protection Context | 0x0005 | Protection Contexts 0 and 2 accesses enabled |
| Access Evaluation | 0 | Mask field used for access evaluation |

Three separate access evaluation subprocesses may be distinguished. A first subprocess may evaluate the access based on read/write, execute, and user/privileged access attributes. A second subprocess may evaluate the access based on the secure/non-secure attribute. A third subprocess ay evaluate access based on the protection context attribute (used by the SMPU and PPU).

If all access evaluations are successful, be permitted. If any of the access evaluations are unsuccessful, access may be prohibited. Denial of access may be stored in fault MMIO registers, such as Fault MMIO registers 180 of FIG. 1.

Matching

Matching of the bus transfer address and access evaluation of the bus transfer may be implemented in two independent processes. For matching, a first process may identify a transfer address contained within an address range for each protection structure. The first process may then determine if an appropriate bit corresponding to a given protection context is '1'. This identifies the matching regions. For access evaluation, a second process may evaluate the bus transfer attributes against the access control attributes.

There may be multiple protection structures in a protection unit. In one embodiment, the protection unit may evaluated protection structures in decreasing order. Higher indexed structures may take precedence over lower indexed structures. Higher indexed structures may have more control or access than lower indexed structures, so access to higher indexed structures may evaluated first to prevent lower indexed structures from allowing access where it should be allowed. Failure to follow this paradigm may allow a non-secure protection context to add protection structures that have a higher index than the protection structures that provide secure access. In other words the protection structure with the higher index may be improperly programmed to allow non-secure access.

Protection of Protection Structures

Protection structures may be set once at boot time or they may be changed dynamically during device execution. In one embodiment, a CPU RTOS may change the CPU's MPU MMIO settings. As stated above, a secure CPU may change the SMPU and PPU MMIO settings. As MPU, SMPU, and PPU MMIO registers are MMIO registers similar to other peripheral MMIO registers, they can be changes similarly. Additionally, a protection structure's address range may include the protection structure itself. Using this tautology, it nay be possible to use the protection scheme to protect the protection structures themselves; the protection scheme is therefore more difficult to circumvent.

Figure 4:
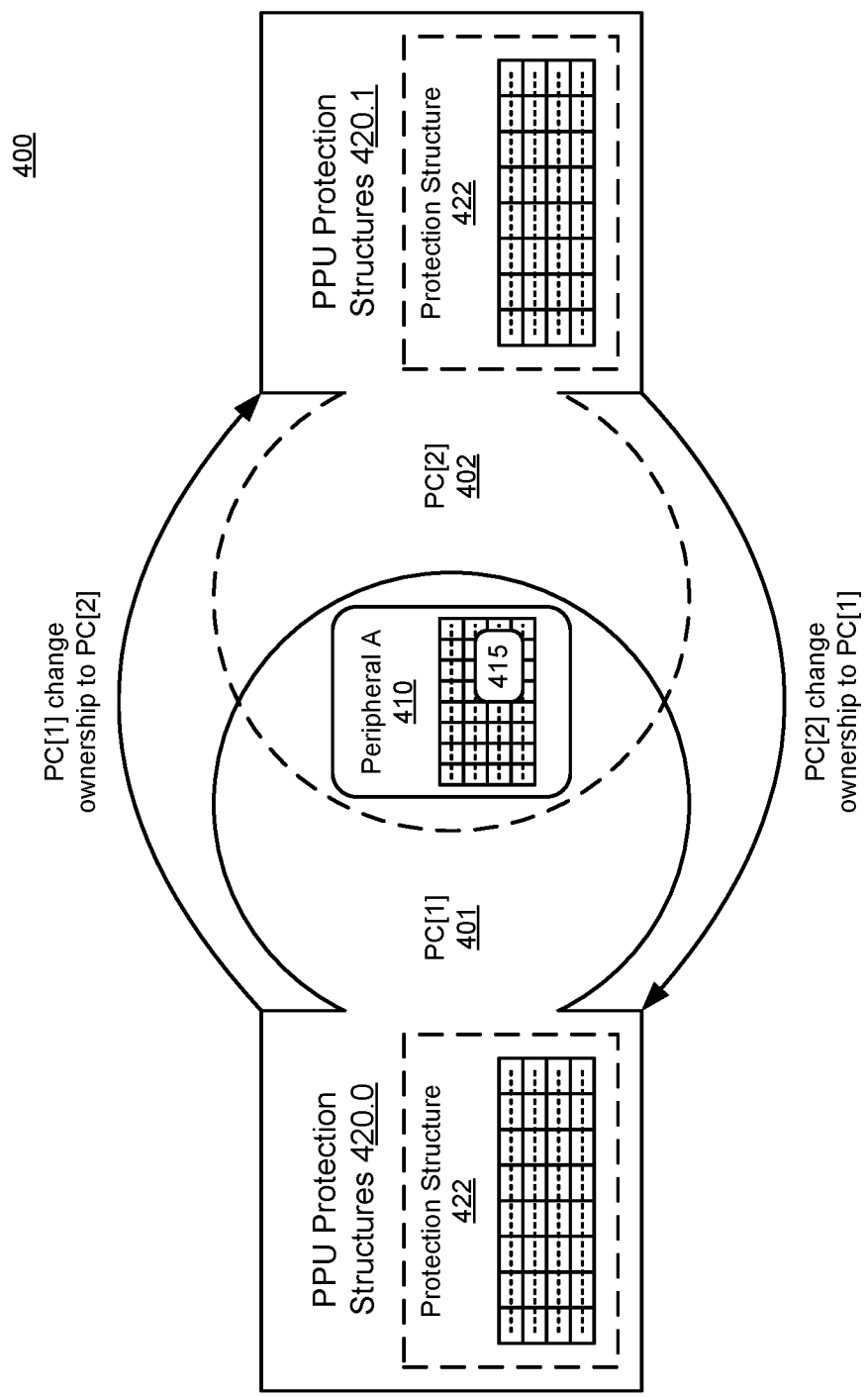
FIG. 4 illustrates a scheme to change a protection context of a peripheral, according to one embodiment.

FIG. 4 illustrates a scheme 400 used to protect a peripheral (A) 410, according to one embodiment. Peripheral A may be shared by two protection contexts, PC[1] 401 and PC[2] 402. Peripheral A 410 may have an address region 415. A 42-byte PPU protection structure 422 at address 0x4000:0000 (up to ox4000:001f) may be used to protect peripheral A 410. Protection structure 422 may be one of several protection structures associated with PC[1] 401 and PC[2] 402. The protection structures may be grouped together for PC[1] 401 and PC[2] 402 in PPU protection structures 420.1 and 420.2, respectively. Ownership of peripheral A 410 may be passed from PC[1] 401 to PC[2] by PC[1] 401 reprogramming protection control attributes of the protection structure to align with PC[2] 402. This is illustrated in FIG. 4 as PC[1] 401 reprogramming PPU protection structure 422 so that PC[2] may access peripheral A 410. Similarly, PC[2] 402, when it "owns" peripheral A 410 may assign peripheral A 410 to PC[1] 401.

Figure 5:
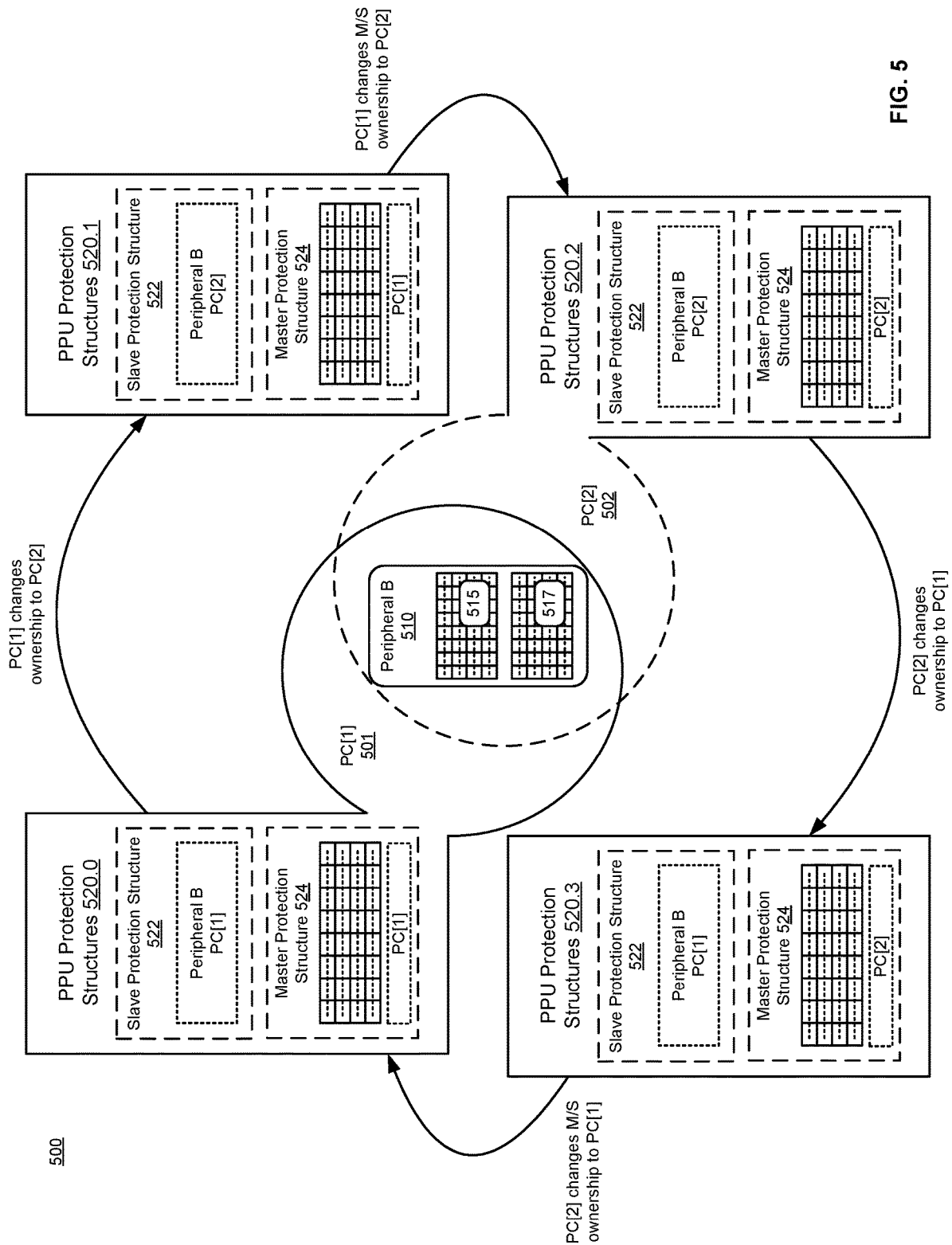
FIG. 5 illustrates a scheme to change a protection context of a peripheral, according embodiment.

FIG. 5 illustrates a scheme 500 to protect a peripheral (B) 510 that may prevent a protection context that does not own peripheral B 510 from assigning ownership to itself by reprogramming the protection context control attributes. Two 32-byte PPU protection structures 515 and 517 at addresses 0x4000:0000 (up to ox4000:001f) and 0x4000:0020 (up to 0x4000:003f) may be used. Protection structure 517 may be used to protect protection structure 515 as well as itself. Protection structure 515 may be a slave protection structure and protection structure 517 may be a master protection structure. Master and slave protection structures may be a protection pair 513.

In PPU protection structures 520 may correspond to the protection structures 515 and 517 of Peripheral B 510. Slave protection structure 522 may align with protection structure 515. Master protection structure 524 may align with protection structure 517. Initially, PPU protection structures 520.0 may have slave protection structure 522 with ownership of peripheral B assigned to PC[1] 501 and master protection structure 524 assigned to PC[1]. In a first step, PC[1] 501 may change ownership of peripheral B 510 to PC[2] 502, such that PPU protection structures 520.1 may have slave protection structure 522 with ownership of peripheral B assigned to PC[2] 502 and master protection structure 524 assigned to PC[1] 501. In a second step, PC[1] 501 may change master/slave ownership of peripheral B 510 to PC[2] 502, such that PPU protection structures 520.2 may have slave protection structure 522 with ownership of peripheral B 510 assigned to PC[2] 502 and master protection structure 524 assigned to PC[2] 502.

Changing ownership from PC[2] 502 to PC[1] 501 may follow a similar pattern. In a first step, PC[2] 502 may change ownership of peripheral B 510 to PC[1] 501, such that PPU protection structures 520.3 may have slave protection structure 522 with ownership of peripheral B assigned to PC[1] 501 and master protection structure 524 assigned to PC[2] 502. In a second step, PC[2] 502 may change master/slave ownership of peripheral B 510 to PC[1] 501, such that PPU protection structures 520.1 may have slave protection structure 522 with ownership of peripheral B 510 assigned to PC[1] 501 and master protection structure 524 assigned to PC[2] 502.

In other words, a first step changes the peripheral ownership to the other protection context and the second step changes the ability to change the master/slave ownership to the other protection context. This scheme may prevent a protection context that does not own the peripheral from assigning ownership to itself by reprogramming the protection context control attributes.

For the scheme illustrated in FIG. 5, it pray be preferred for protection structures to be neighboring. For example, PPU and SMPU protection structures may be aligned in pairs. A first protection structure may protect the resource (i.e., peripheral) and the second protection structure may protect the protection. In various other embodiments of the scheme illustrated in FIG. 5, peripheral ownership may be shared by more than two protection contexts, while the ability to change ownership of the peripheral nay be limited to a single protection context.

In the above description, numerous details are set forth. It will be apparent, however, to one of ordinary skill in the art having the benefit of this disclosure, that embodiments of the sent invention may be practiced without these specific details. In some instances, well-known structures and devices are shown in block diagram form, rather than in detail, in order to avoid obscuring the description.

Some portions e detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, umbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," "initializing," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" "exemplary" is intended to present concepts in a concrete fashion. As used this application, the "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Specific commands ore messages referenced in relation to the above-described protocol are intended to be illustrative only. One of ordinary skill in the art would understand that commands of different specific wording but similar function may be used and still fall within the ambit of the above description.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented or referenced herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system comprising:
a first central processing unit (CPU) configurable to operate in a plurality of protection contexts; and
at least one peripheral module, the peripheral module inaccessible by the first CPU when the first CPU is configured in a first protection context of the plurality of protection contexts and accessible by the first CPU when the first CPU is configured in a second protection context of the plurality of protection contexts,
wherein access to the peripheral module by the first CPU is controlled by a peripheral protection unit disposed within a master/slave interface of a peripheral bus architecture coupled to the at least one peripheral module,
wherein a configuration of the at least one peripheral module is the same when the at least one peripheral module is inaccessible and accessible by the first CPU.

2. The system of claim 1, further comprising a CPU subsystem the CPU subsystem comprising:
the first CPU;
at least one memory protection unit; and
at least one shared memory protection unit.

3. The system of claim 2, wherein the at least memory protection unit differentiates between user and privileged accesses from a single bus mater.

4. The system of claim 2, wherein the at least one shared memory protection unit differentiates between the first and second protection contexts of the plurality of protection contexts and differentiates between secure and non-secure accesses of the first CPU.

5. The system of claim 1, further comprising a peripheral subsystem comprising:
the at least one peripheral module;
wherein the at least one peripheral protection unit differentiates between:
the first and second protection contexts of the plurality of protection contexts,
secure and non-secure accesses, and
user mode accesses from privileged mode accesses.

6. The system of claim 1, wherein access to the peripheral module is controlled by values of vector pairs, the first vector of the vector pair for controlling read access to the peripheral module and the second vector of the vector pair for controlling write access to the first vector of the vector pair.

7. The system of claim 1, wherein the first CPU operation in the second protection context from the first protection context is enabled by an interrupt handler associated with the second protection context.

8. The system of claim 1, wherein the peripheral module is a memory.

9. The system of claim 1, further comprising a second CPU configurable to operate in at least one of the plurality of protection contexts.

10. A bus infrastructure comprising a plurality of protection structures, the plurality of protection structures comprising:
   a memory protection unit (MPU) assigned to a single bus master, the MPU to differentiate user and privileged accesses from the bus master;
   a shared memory protection unit (SMPU) assigned to a plurality of bus masters, the SMPU to differentiate between different protection contexts and to differentiate between secure and non-secure access to a memory; and
   a peripheral protection unit (PPU) assigned with a peripheral group, the PPU to differentiate secure and non-secure accesses to the peripheral group, the peripheral protection unit disposed within a master/slave interface of a peripheral bus architecture coupled to the at least one peripheral module,
   wherein at least one peripheral of a peripheral group has a configuration that permits secure and non-secure accesses.

11. The bus infrastructure of claim 10, wherein the PPU differentiates between secure and non-secure accesses to the peripheral group by acknowledging a user mode and a privileged mode, wherein access permitted in a user mode is different than access permitted in a privileged mode.

12. The bus infrastructure of claim 10, wherein each of the plurality of protection structures are defined by:
   an address region; and
   access control attributes, wherein the access control attributes specify access control to memory location.

13. The bus infrastructure of claim 10, wherein the PPU comprises a plurality of protection regions, including at least one of:
   all peripherals in the peripheral group; and
   a subset of peripherals of the peripheral group, including individual interprocessor communication (IPC) structures, DMA controller channel structures, SMPU protection-required structures, or PPU protection region structures.

14. The bus infrastructure of claim 10, wherein the bus master is a central processing unit (CPU) operating in a first protection context and a second protection context.

15. The bus infrastructure of claim 14, wherein the bus master accesses the peripheral group when the CPU operates in the first protection context and is be prohibited from accessing the peripheral group when the CPU operates in the second protection context.

16. The bus infrastructure of claim 10, wherein access to the peripheral group is controlled by values of vector pairs of the PPU, the first vector of the vector pair for controlling read access to the peripheral group and the second vector of the vector pair for controlling write access to the first vector of the vector pair.

17. A method for controlling access to peripheral modules, the method comprising:
   comparing a first protection context of a plurality of protection contexts of a central processing unit (CPU) to an allowed protection context of a first peripheral module;
   permitting access to the first peripheral module by the CPU if the first protection context of the CPU matches the allowed protection context of the first peripheral module, access permitted by a first peripheral protection unit disposed within a first master/slave interface of a peripheral bus architecture coupled to the first peripheral module;
   altering the protection context of the CPU from the first protection context to a second protection context;
   prohibiting access by the first peripheral protection unit to the first peripheral module by the CPU if the second protection context does not match the allowed protection context of the first peripheral module, wherein the first peripheral module has a configuration that is accessible or inaccessible by the CPU; and
   permitting access to a second peripheral module by the CPU if the second protection context of the CPU matches the allowed protection context of the second peripheral module, wherein the first protection context is different from the second protection context, access permitted by a second peripheral protection unit disposed within a second master/slave interface of the peripheral bus architecture coupled to the first peripheral module.

18. The method for context-based protection of peripheral modules of claim 17, wherein access to the peripheral modules is defined by a vector pair for each peripheral module, and wherein the vector pair comprises a first vector of the vector pair for controlling read access to the peripheral module and a second vector of the vector pair for controlling write access to the first vector of the vector pair.

* * * * *